(12) United States Patent
Wu et al.

(10) Patent No.: US 9,232,170 B2
(45) Date of Patent: Jan. 5, 2016

(54) TELEVISION SIGNAL RECEIVING DEVICE AND METHOD FOR DETERMINING WHETHER CHANNEL INCLUDES TELEVISION PROGRAM SIGNAL

(71) Applicant: MStar Semiconductor, Inc., Hsinchu Hsien (TW)

(72) Inventors: Yu-Peng Wu, Hsinchu County (TW); Fong-Shih Wei, New Taipei (TW)

(73) Assignee: MSTAR SEMICONDUCTOR, INC., Hsinchu Hsien (TW)

(*) Notice: Subject to any disclaimer, the term of this patent is extended or adjusted under 35 U.S.C. 154(b) by 0 days.

(21) Appl. No.: 14/478,469

(22) Filed: Sep. 5, 2014

(65) Prior Publication Data

US 2015/0062439 A1 Mar. 5, 2015

(30) Foreign Application Priority Data

Sep. 5, 2013 (TW) .............................. 102131998 A (51) Int. Cl.
| | | |
|---|---|---|
| H04N 5/50 | (2006.01) | |
| H04N 5/44 | (2011.01) | |
| H04H 40/00 | (2009.01) | |
| H04H 20/26 | (2008.01) | |
| H04H 20/95 | (2008.01) | |
| H04H 40/27 | (2008.01) | |

(52) U.S. Cl.
CPC .................. *H04N 5/50* (2013.01); *H04H 20/26* (2013.01); *H04H 20/95* (2013.01); *H04H 40/00* (2013.01); *H04H 40/27* (2013.01)

(58) Field of Classification Search
CPC ......... H04N 5/50; H04N 5/44; H04N 5/4401; H04N 5/4446; H04L 27/2647; H04L 27/2671; H04L 27/2672; H04L 27/22; H04L 27/14; H04L 27/1563; H04L 27/1525; H04L 27/3809

USPC .......... 348/725, 726, 731–733, 735; 375/316, 375/323, 329, 334, 344, 345
IPC ................................................ H04N 5/50,5/44
See application file for complete search history.

(56) References Cited

U.S. PATENT DOCUMENTS

| | | | |
|---|---|---|---|
| 7,835,475 B2 | 11/2010 | Adachi | |
| 7,848,463 B2* | 12/2010 | Li ........................ | H04L 25/0232 370/208 |
| 8,605,835 B2* | 12/2013 | Matsumura ......... | H04L 27/2659 370/464 |
| 2001/0007480 A1* | 7/2001 | Hong ..................... | H04N 5/455 348/725 |
| 2011/0002422 A1 | 1/2011 | Cheng et al. | |

OTHER PUBLICATIONS

Taiwan Patent Office, "Office Action," Jul. 14, 2015.

* cited by examiner

*Primary Examiner* — Sherrie Hsia
(74) *Attorney, Agent, or Firm* — WPAT, PC; Justin King (57) ABSTRACT

A television signal receiving device and a method for determining whether a target channel includes a television program signal are provided. The television signal receiving device, including a tuner to receive a radio-frequency (RF) signal, to select the target channel from a plurality of channels in the RF signal, and to down-convert the target channel, includes: an analog-to-digital converter (ADC), configured to convert an analog signal carried in the down-converted target channel to a digital signal; an operation circuit, configured to perform an operation on the digital signal to obtain a correlation comparing result; and a control circuit, configured to determine whether the target channel includes the television program signal according to the correlation comparing result.

18 Claims, 6 Drawing Sheets

TELEVISION SIGNAL RECEIVING DEVICE AND METHOD FOR DETERMINING WHETHER CHANNEL INCLUDES TELEVISION PROGRAM SIGNAL

This application claims the benefit of Taiwan application Serial No. 102131998, filed Sep. 5, 2013, the subject matter of which is incorporated herein by reference.

BACKGROUND OF THE INVENTION

1. Field of the Invention

The invention relates in general to a television signal receiving device and a method for determining whether a channel includes a television program signal, and more particularly to a device and a method capable of quickly determining whether a channel includes a television program signal for an Integrated Services Digital Broadcasting-Terrestrial (ISDB-T) television system or a Digital Video Broadcasting-Terrestrial (DVB-T) television system.

2. Description of the Related Art

Figure 1:
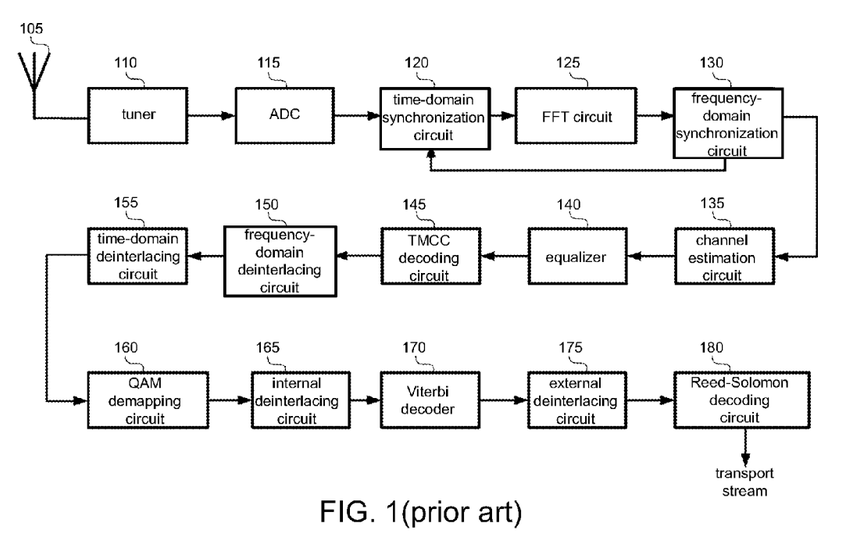
FIG. 1 is a functional block diagram of a conventional Integrated Services Digital Broadcasting-Terrestrial (ISDB-T) signal receiver.

One function of a television receiver is scanning television channels, i.e., determining whether a specific television channel includes a television program signal. FIG. 1 shows a functional block diagram of a conventional Integrated Services Digital Broadcasting-Terrestrial (ISDB-T) signal receiver. In digital television broadcasting, a radio-frequency (RF) signal includes multiple television channels, each of which including more than one television program signals. After receiving the RF signal from an antenna 105, a tuner 110 selects a target channel from the multiple channels, and down-converts the RF signal in the target channel to an intermediate low frequency signal. The target channel is inspected by a subsequent circuit whether it includes the television program signal. An analog-to-digital converter (ADC) 115, coupled to the tuner 110, converts an analog signal carried in the target channel to a digital signal. A fast Fourier transform (FFT) circuit 125 converts the digital signal from the time domain to the frequency domain, and includes synchronization circuits at its front and rear ends. As the two synchronization circuits respectively process the synchronization procedure of the digital signal in the time domain and the frequency domain, they are respectively named as a time-domain synchronization circuit 120 and a frequency-domain synchronization circuit 130. The time-domain synchronization circuit 120 is coupled to the ADC 115. Since the time-domain synchronization circuit 120 and the frequency-domain synchronization circuit 130 are respectively located and front and rear ends of the FFT circuit 125, the two may also respectively be referred to as a pre-FFT synchronization circuit and a post-FFT synchronization circuit.

The time-domain synchronization circuit 120 analyzes and obtains required synchronization information of signals in the time domain; the frequency-domain synchronization circuit 130 analyzes and obtains required synchronization information of signals in the frequency domain. In practice, it may be regarded that the time-domain synchronization circuit 120 processes a coarse-tune step of the synchronization procedure of the digital signal, and the frequency-domain synchronization circuit 130 processes a fine-tune step of the synchronization procedure for the digital signal. The synchronization procedure that the frequency-domain synchronization circuit 130 handles for the digital signal includes a correlation operation to obtain a plurality of correlation values, according to which a carrier frequency offset (CFO) of the digital signal can be determined. More specifically, the CFO may include an integer carrier frequency offset (ICFO) and a fractional carrier frequency offset (FCFO), and the correlation values may be further categorized into ICFO correlation values and FCFO correlation values. As shown in FIG. 1, the frequency-domain synchronization circuit 130 is directly coupled to the time-domain synchronization circuit 120, in the aim of transmitting ICFO information to the time-domain synchronization circuit 120. Thus, the time-domain synchronization circuit 120 may compensate the digital signal according to the ICFO correlation values such that the frequency offset no longer exists in the compensated signal.

Again referring to FIG. 1, a channel estimation circuit 135 is coupled to the frequency-domain synchronization circuit 130, and mainly serves for estimating a multipath interference of the digital signal. An equalizer 140 is coupled to the channel estimation circuit 135, and mainly serves for filtering out signals of channels other than a main channel according to an estimation result of the channel estimation circuit 135. A transmission and multiplexing configuration control (TMCC) decoding circuit 145 is coupled to the equalizer 140, and analyzes and obtains information such as a modulation mechanism and a code rate of inner code of the digital signal. The TMCC decoding circuit 145 is sequentially coupled to a frequency-domain deinterlacing circuit 150 and a time-domain deinterlacing circuit 155, which respectively deinterlace the digital signal in the frequency domain and in the time domain. A quadrature amplitude modulation (QAM) demapping circuit 160 is coupled to the time-domain deinterlacing circuit 155, and demodulates the digital signal. Circuits coupled subsequent to the QAM demapping circuit are sequentially coupled an internal deinterlacing circuit 165, a Viterbi decoder 170 and an external deinterlacing circuit 175. The internal deinterlacing circuit 165 and the external deinterlacing circuit 175 internally and externally deinterlace the digital signal, respectively. The Viterbi decoder 170 performs Viterbi decoding on the digital signal. Eventually a Reed-Solomon decoding circuit 180, coupled to the external deinterlacing circuit 175, performs Reed-Solomon decoding on the digital signal to generate a transport stream signal required by the television system.

In the prior art, it can be learned whether a target channel includes a program signal usually only after the Reed-Solomon decoding circuit 180 completes the corresponding decoding process. In some publications, it is proposed that information such as the foregoing modulation mechanism and code rate of inner rate be utilized to bring forward the time point for determining whether the target channel includes a television program signal. However, as the average time needed for such determination process is about 300 ms to 550 ms, the total time required for scanning all channels adds up to a substantial amount for a large number of channels.

SUMMARY OF THE INVENTION

The invention is directed to a television signal receiving device and a method for determining whether a channel includes a television program signal to save the time required for scanning channels.

The present invention discloses a television signal receiving device for determining whether a target channel includes a television program signal. The television signal receiving device, including a tuner to receive an RF signal, to select the target channel from a plurality of channels in the RF signal, and to down-convert the target channel, includes: an ADC, configured to convert an analog signal carried in the down-converted target channel to a digital signal; an operation circuit, configured to perform an operation on the digital signal to obtain a correlation comparing result; and a control circuit, configured to determine whether the target channel includes the television program signal according to the correlation comparing result.

The present invention further discloses a method for determining whether a target channel includes a television program signal. The target channel is selected from a plurality of channels included in an RF signal and processed by a down-converting process. The method includes: converting an analog signal carried in the down-converted target channel to a digital signal; performing an operation on the digital signal to obtain a correlation comparing operation result; and determining whether the target channel includes the television program signal according to the correlation comparing result.

The television signal receiving device and the method for determining whether a target channel includes a television program signal are capable of quickly determining whether the target channel transmits the television program signal. Compared to the prior art, the present invention is capable of determining whether the target channel includes the television program signal several signal processing procedures ahead, thereby saving the time required for scanning channels.

The above and other aspects of the invention will become better understood with regard to the following detailed description of the preferred but non-limiting embodiments. The following description is made with reference to the accompanying drawings.

DETAILED DESCRIPTION OF THE INVENTION

Technical terms of the application are based on general definition in the technical field of the application. If the application describes or explains one or some terms, definition of the terms are based on the description or explanation of the application.

The present invention discloses a television signal receiving device and a method for determining whether a target channel includes a television program signal that are capable of accelerating a speed of scanning channels. The device and the method are at least applicable ISDB-T television systems and DVB-T television systems. In possible implementation, one skilled person in the art may choose equivalent elements or steps to implement the disclosure based on the disclosure of the application. That is, the implementation of the disclosure is not limited by the embodiments disclosed in the disclosure. Further, a part of the elements included in the television signal receiving device of the disclosure are individually known elements. Without affecting the full disclosure and possible implementation of the devices, details of the known elements are omitted. Further, the method for determining whether a target channel includes a television program signal may be implemented by the television signal receiving device of the disclosure or equivalent devices. Without affecting the full disclosure and possible implementation of the method of the disclosure, the description of the method focuses on the steps of the method instead of hardware.

Figure 2:
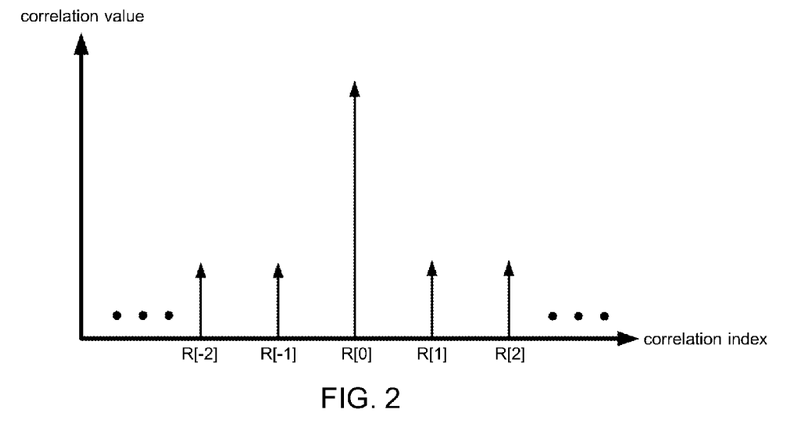
FIG. 2 is a relationship diagram of an ICFO correlation value and an ICFO correlation index in the presence of a television program signal.

FIG. 2 shows a relationship diagram of an ICFO correlation value and an ICFO correlation index. When the target channel includes the television program signal, an extremely large value appears in the ICFO correlation value. For example, in FIG. 2, referring to the ICFO correlation value corresponding to an ICFO correlation index R[0], the ICFO correlation values corresponding to the neighboring ICFO correlation indices are similar, and are quite different from the ICFO correlation value R[0] in comparison. The ICFO correlation value R[0] may indicate a position of the frequency offset, e.g., corresponding to 6000 Hz, and the time-domain synchronization circuit 120 compensates the frequency offset of the digital signal according to this value.

Figure 3:
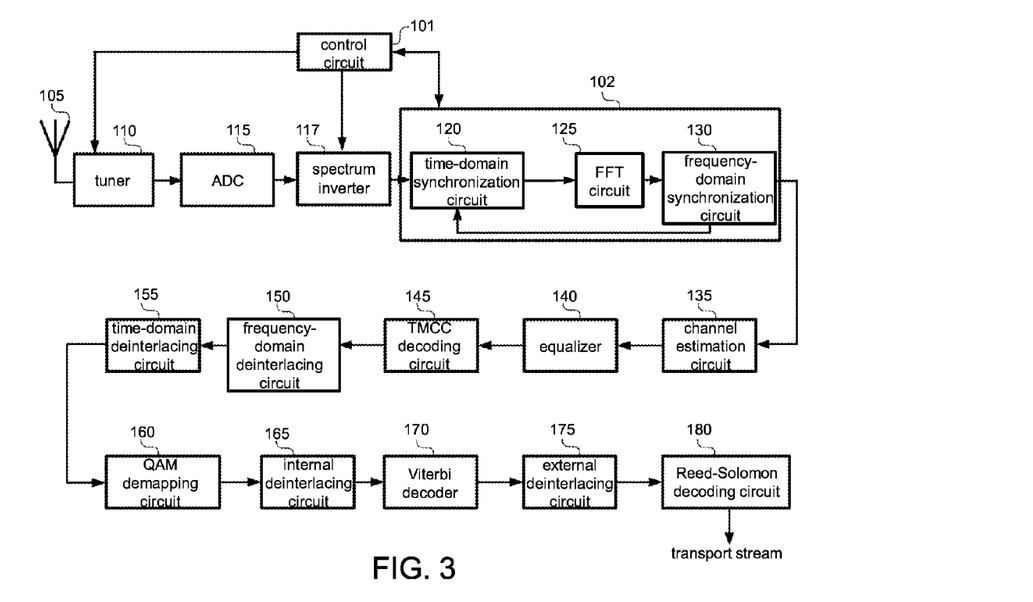
FIG. 3 is a functional block diagram of an ISDB-T signal receiver according to an embodiment of the present invention.
Figure 4:
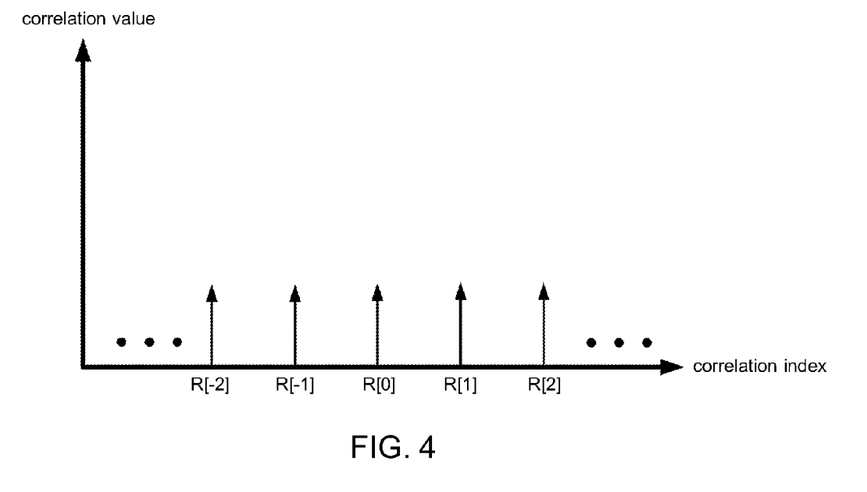
FIG. 4 is a relationship diagram of an ICFO correlation value and an ICFO correlation index in the absence of a television program signal.

FIG. 3 shows a functional block diagram of an ISDB-T signal receiver according to an embodiment of the present invention. As previously described, one main function of the time-domain synchronization circuit 120, the FFT circuit 125 and the frequency-domain synchronization circuit 130 is to perform a correlation operation on the digital signal in the time domain and in the frequency domain. The correlation operation result includes the ICFO correlation value and the FCFO correlation value of the digital signal, and the CFO of the digital signal is compensated at least according to the ICFO correlation value. Thus, the three circuits performing the above function may be collectively referred to as an operation circuit 102. Any circuit that can estimate and accordingly compensate the CFO of the digital signal is an equivalent circuit of the operation circuit 102. In FIG. 3, the functional block diagram further includes a control circuit 101 that is coupled to the tuner 110 and the operation circuit 102. After the time-domain synchronization circuit 120 compensates the CFO of the digital signal according to the ICFO correlation value estimated by the frequency-domain synchronization circuit 130, if the frequency-domain synchronization circuit 130 re-estimates the CFO by the same method, the result will appear as FIG. 2. However, one difference is that, an ideal frequency offset position indicated by the ICFO correlation index R[0] is expected to correspond to the position at 0 Hz, meaning that the compensated digital signal contains no frequency offset. FIG. 2 shows a situation where the target channel includes the television program signal. If the target channel does not include the television signal, the ICFO correlation index corresponding to the ICFO correlation value is as shown in FIG. 4. Referring to FIG. 4, no ICFO correlation that is particularly distinguished is observed from the diagram. This is because when the target channel does not include the television program signal, an unknown noise signal is transmitted in the channel, and a result obtained from performing CFO estimation on the unknown noise signal does not yield specific physical meaning. Therefore, even if the time-domain synchronization circuit 130 selects an ICFO correlation index that represents the CFO at that time point, the target compensated by the time-domain synchronization circuit 120 is different noise signals as the noise signal constantly changes. That is to say, after again estimating the ICFO correlation value on the compensated noise signal by the frequency-domain synchronization signal, the obtained result does not indicate that the CFO of the signal corresponds to 0 Hz. Therefore, in the present invention, whether the target channel includes the television program signal may be determined according to the ICFO correlation value of the second time (i.e., the second ICFO correlation value). For example, the control circuit 101 may be utilized to determine whether the target channel includes the television program signal. The frequency-domain synchronization circuit 130 transmits the second ICFO correlation value to the control circuit 101, which then determines whether the target channel includes the television program signal according to the second ICFO correlation value. In another determination approach, the frequency-domain synchronization circuit 130 may independently determine according to an offset value of the CFO. If the target frequency includes the television program signal, the frequency-domain synchronization circuit 130 notifies the control circuit 101 through setting a flag. For example, the frequency-domain synchronization circuit 130 may change a register value of a register, and the control circuit 101 needs only continually monitor the register value to learn whether the target channel includes the television program signal. That is to say, in the control circuit 101, a circuit that determines whether the target channel includes the television program signal according to the second ICFO correlation value may be integrated into the frequency-domain synchronization circuit 130. That is, the determination may be performed either by directly determining according to the second ICFO correlation value by the control circuit 101, or by indirectly determining according to the second ICFO correlation value by the control circuit 101.

In summary, in the present invention, the operation circuit 102 may be controlled by the control circuit 101 to estimate the ICFO correlation value for two times, and whether the target channel includes the television program signal can be learned according to the ICFO correlation values. More specifically, when the second ICFO value indicates that the CFO of the digital signal is 0 (i.e., the ICFO correlation index corresponding to an extremum maximum value of the ICFO correlation value corresponds to 0 Hz), it means that the target channel includes the television program signal. In contrast, when the second ICFO correlation value indicates that the CFO of the digital signal is not zero, it means that the signal included in the target channel is noise instead of the television program signal. At this point, the control circuit 101 may control the tuner 110 to select another channel. Thus, circuits subsequent to the frequency-domain synchronization circuit 130 do not perform operations on the signal of the target channel, and a significantly amount of operation time can be saved.

In addition to the above determination method, the present invention discloses another determination method that similarly determines according to the ICFO correlation value. Referring to FIG. 2 and FIG. 4, when the target channel includes the television signal (as shown in FIG. 2), an extremely large ICFO correlation value (which is much larger than neighboring correlation values) is depicted in the relationship diagram of the ICFO correlation value and the ICFO correlation index. However, when the target channel does not include the television program signal (as shown in FIG. 4), no ICFO correlation value that is particularly large is distinguished. The second determination method exercises such characteristic. An extremely large ICFO correlation value is first identified from the operation results of the ICFO correlation value and then compared with neighboring ICFO correlation values. The comparison may be carried out by arithmetic calculations, e.g., dividing the extremely large ICFO correlation value by the neighboring ICFO correlation value. When a ratio obtained is greater than a predetermined threshold, it means that the target channel includes the television program signal. Alternatively, when an absolute value between the two is greater than a predetermined threshold, it also means that the target channel includes the television program signal.

Similar to the first determination method, in the second determination method, the control circuit 101 may similarly determine according to the ICFO correlation value by a directly or indirect approach. In the direct approach, the frequency-domain synchronization circuit 130 first transmits the ICFO correlation value to the control circuit 101, and the above operation is performed by the control circuit 101. In the indirect approach, the above operation is performed by the frequency-domain synchronization circuit 130, and the control circuit 101 is then notified through setting a flag after the operation is performed.

Under certain circumstances, the television program signal in the target channel is transmitted in an inverted spectrum. The term "inverted" is relative to a predetermined spectrum processing method of the tuner 110. Whether the television program signal of each channel is transmitted in a positive spectrum or negative spectrum is determined by a program provider (e.g., a television station), and such is unknown to the tuner 110. If the program signal of the target channel is in an inverted spectrum, an extremely large correlation value does not appear in the ICFO correlation value estimated by the operation circuit 102, and so both of the above determination methods will fail. To prevent a misjudgment, when the foregoing step determines that the target channel does not include the television program signal, the control circuit 101 controls a spectrum inverter 117 to perform a spectrum inversion on the digital signal, and the operation circuit 102 then performs an correlation operation on the digital signal having inverted spectrum and estimates the ICFO correlation value. The spectrum inverter 117 is coupled between the ADC 115 and the operation circuit 102. Having obtained the ICFO correlation value, the control circuit 101 or the frequency-domain synchronization circuit 130 then performs one of the above determination methods to determine whether the target channel includes the television program signal. Conceptually, the spectrum inversion performed by the spectrum inverter 117 is swapping a real part (I-part) with an imaginary part (Q-part) of the digital signal in a complex number (e.g., swapped from a+bj to b+aj). Alternatively, for the digital signal in a complex number, a complex conjugate is obtained, and the digital signal after IQ swap or the conjugated digital signal is process by FFT to obtain a spectrum that is inverted. In other words, a largest data tone and a smallest data tone are swapped, a second largest data tone and a second smallest data tone are swapped, and so forth.

The present invention is also applicable to a DVB-T television system. When applied to a DVB-T television system, the circuit block diagram subsequent to the equalizer 140 of the television signal receiver in FIG. 3 may be slightly different, with however the tuner 110, the ADC 115 and the operation circuit 102 still being essential circuits for the DVB-T television system. Further, the spectrum inverter 117 in the DVB-T television system can also achieve the same effect.

Figure 5:
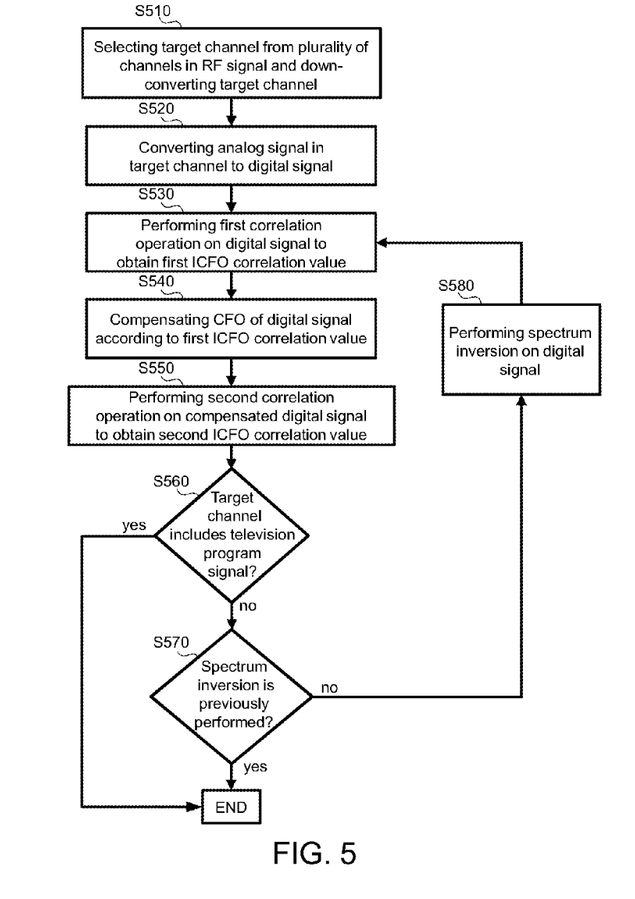
FIG. 5 is a flowchart of a method for determining whether a target channel includes a television program signal according to an embodiment of the present invention.

FIG. 5 shows a flowchart of a method for determining whether a target channel includes a television program signal. In addition to the foregoing television signal receiving device, the present invention further discloses a method for determining whether a target channel includes a television program signal. The method is applied to an ISDB-T or DVB-T television system to quickly determine whether a target channel includes a television program signal. The method of the present invention is performed by the foregoing television signal receiver or an equivalent device. As shown in FIG. 5, the method according to an embodiment of the present invention includes following steps.

In step S510, a target channel is selected from a plurality of channels included in an RF signal, and the target channel is down-converted. In television broadcasting, an RF signal usually includes multiple channels. To check whether each channel includes a television program signal, this step first selects one target channel as a target to be checked.

In step S520, an analog signal carried in the target channel is converted to a digital signal. A television program signal is broadcasted in an analog form, but a digital form is utilized when checking whether the television program signal is present. Thus, the analog signal carried in the target channel is converted to the digital signal.

In step S530, a first correlation operation is performed on the digital signal to obtain a first ICFO correlation value. That is, a first correlation operation is performed on the digital signal to obtain a correlation value of the first time (i.e., a first correlation value). If the television program signal is present, the relationship between the ICFO correlation value and the ICFO correlation index is as shown in FIG. 2; if the television signal is not present, the relationship between the ICFO correlation value and the ICFO correlation index is as in FIG. 4.

In step S540, the CFO of the digital signal is compensated by the first ICFO correlation value. If the television program signal is present, as shown in FIG. 2, an extremely large ICFO correlation value is obtained, and the ICFO correlation index corresponding to this ICFO correlation value corresponds to the CFO position. For example, the ICFO correlation index R[0] corresponds to 6000 Hz, and so the compensated offset value is 6000 Hz.

In step S550, a second correlation operation is performed on the compensated digital signal to obtain a second ICFO correlation value. Having undergone the previous step of compensating the CFO, the digital signal theoretically does not contain any frequency offset. Thus, the second ICFO correlation value obtained in this step is expected to indicate that the digital signal does not contain any frequency offset, i.e., the ICFO correlation index R[0] in FIG. 2 is expected to correspond 0 Hz. However, if the target channel includes a noise signal instead of a television program signal, as shown in FIG. 4, even if a relatively large ICFO correlation value is identified in the previous step, the identified ICFO correlation value may correspond to an incorrect frequency offset, and the compensation target is a noise signal that constantly changes with time. As a result, the ICFO correlation value of the second time (i.e., the second ICFO correlation value) obtained in this step has a great chance of indicating that the digital signal contains a frequency offset. According to the second ICFO correlation value, i.e., by checking whether the compensated digital channel still includes any frequency offset, it can be known whether the target channel includes the television program signal.

In step S560, it is determined whether the target channel includes the television program signal. More specifically, in this step, it is determined whether the target channel includes the television program signal according to the second ICFO correlation value. In conclusion, if the second ICFO correlation value indicates a frequency shift position that corresponds to a frequency shift of 0 Hz, it means that the target channel includes the television program signal. However, if the second ICFO correlation value indicates a frequency shift position that does not correspond to a frequency shift of 0 Hz, it means that the target channel includes the noise signal instead of the television program signal. The process ends when the target channel includes the television program signal, or else step S570 is performed.

In step S570, it is determined whether a spectrum inversion is previously performed. Under certain conditions, the television program signal in the target channel is spectrum inverted. If so, even if the target channel includes the television program signal, the target channel may still be determined as not including the television program signal after the above step. Therefore, it can only be ascertained that the target channel does not include the television program signal after making sure that the digital signal is previously spectrum inverted. Step S580 is performed if the digital signal is not previously spectrum inverted, or else the process ends if the digital signal is previously spectrum inverted.

In step S580, a spectrum inversion is performed on the digital signal. The spectrum inverted digital signal will display correct data, and so steps S530 to S560 are iterated to ascertain whether the target channel includes the television program signal.

Figure 6:
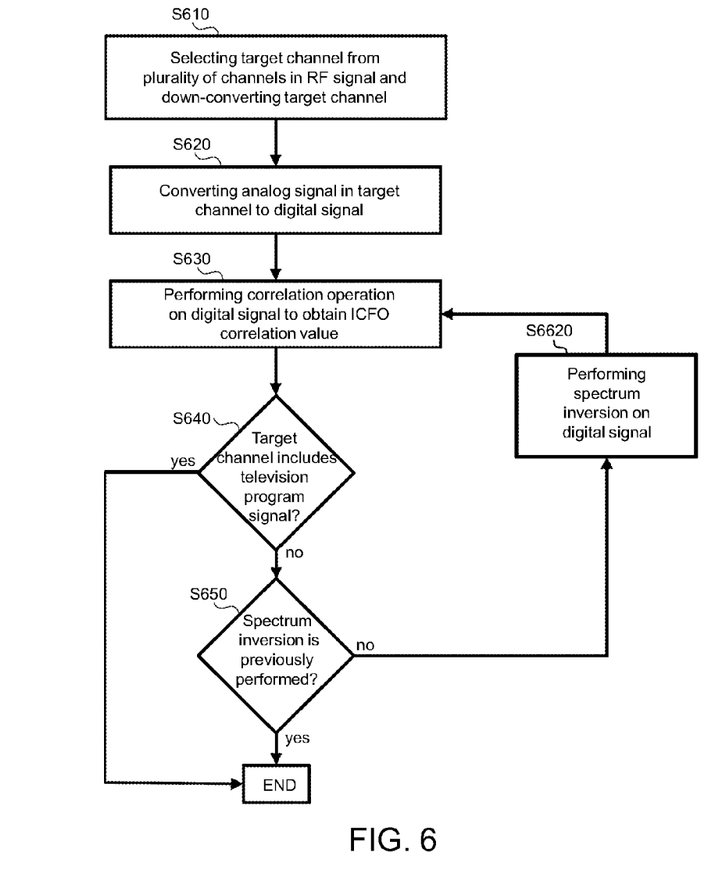
FIG. 6 is a flowchart of a method for determining whether a target channel includes a television program signal according to another embodiment of the present invention.

FIG. 6 shows a flowchart of a method for determining whether a target channel includes a television program signal according to another embodiment of the present invention. As shown in FIG. 6, steps S610 to S630 are identical to steps S510 to S530 of the previous embodiment, and shall be omitted herein. Other steps of the embodiment are described below.

In step S640, it is determined whether the target channel includes the television signal. More specifically, in this step, it is determined whether the target channel includes the television program signal according to an extremum maximum correlation value of the ICFO correlation value and its neighboring correlation values. As previously stated, FIG. 2 and FIG. 4 respectively represent relationship diagrams of situations where the target channel includes and does not include the television program signal. Therefore, the extremum maximum ICFO correlation value in FIG. 2 can be utilized to determine whether the target channel includes the television program signal. Details of the determination method can be referred to from the description associated with the above device, and are omitted herein. The process ends when the target channel includes the television program signal, or else step S660 is performed.

Steps 650 and S660 are identical to steps S570 and S580 of the previous embodiment, and shall be omitted herein.

In the device or method of the present invention, the average time required for determining whether one channel includes the television program signal is about 150 ms to 200 ms, which is significantly reduced compared to a conventional solution that requires about 300 ms to 550 ms. Further, in situations with spectrum inversion, a conventional solution requires about 600 ms to 1000 ms for the determination process, whereas the present invention yields a result in only 200 ms to 250 ms. Therefore, compared to a conventional solution, the present invention is capable of more quickly determining whether a channel includes a television program signal.

One person skilled in the art can understand details and possible implementation variations of the method according to the embodiments in FIG. 5 and FIG. 6 based on the disclosed contents of the device in FIG. 3. Without affecting the full disclosure and possible implementation, such repeated description is omitted herein. Further, the embodiments of the present invention are examples for explaining the present invention, not limiting the present invention. In possible implementation, one skilled person in the art would selectively implement part or all technical features of any embodiment of the application or selectively combine part or all technical features of the embodiments of the application based on the disclosure of the present invention to enhance the implementation flexibility of the present invention. Further, although an ISDB-T television system is taken as an example in the foregoing embodiments, based on the disclosure of the present invention, one person skilled in the art may appropriately apply the present invention to other types of television system, e.g., a DVB-T television system.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A television signal receiving device, for determining whether a target channel includes a television program signal, comprising a tuner to receive a radio-frequency (RF) signal, select the target channel from a plurality of channels included in the RF signal, and down-convert the target channel, the television signal receiving device comprising:
   an analog-to-digital converter (ADC), configured to convert an analog signal carried in the down-converted target channel to a digital signal;
   an operation circuit, configured to perform an operation on the digital signal to obtain a correlation comparing result; and
   a control circuit, configured to determine whether the target channel includes the television program signal according to the correlation comparing result.

2. The television signal receiving device according to claim 1, wherein the correlation comparing result comprises a plurality correlation values, and the control circuit determines whether the target channel includes the television program signal according to a maximum correlation value in the correlation values.

3. The television signal receiving device according to claim 2, wherein the control circuit determines whether the target channel includes the television program signal according to one of a ratio and a difference between the maximum correlation value and a neighboring correlation value.

4. The television signal receiving device according to claim 1, wherein the operation circuit compensates a carrier frequency offset (CFO) of the digital signal according to a pre-operation result of a first operation, and performs a second operation on the compensated digital signal to obtain the correlation comparing result.

5. The television signal receiving device according to claim 4, wherein the control circuit determines whether the target channel includes the television program signal according to a frequency offset position indicated by the correlation comparing result.

6. The television signal receiving device according to claim 1, wherein the operation circuit comprises:
   a time-domain synchronization circuit, configured to compensate a CFO of the digital signal in time domain;
   a fast Fourier transform (FFT) circuit, configured to convert the compensated digital signal in time domain to frequency domain; and
   a frequency-domain synchronization circuit, configured to perform a correlation comparison on the digital signal converted to frequency domain to update the correlation comparing result.

7. The television signal receiving device according to claim 1, further comprising:
   a spectrum inverter, coupled between the ADC and the operation circuit;
   wherein, when the control circuit determines that the target channel does not include the television program signal, the control circuit controls the spectrum inverter to perform one of complex conjugate and IQ swap on the digital signal.

8. The television signal receiving device according to claim 1, wherein when the control circuit determines that the target channel does not include the television program signal, the control circuit controls the tuner to select another channel from the plurality of channels.

9. The television signal receiving device according to claim 1, applied to an Integrated Services Digital Broadcasting-Terrestrial (ISDB-T) television system or a Digital Video Broadcasting-Terrestrial (DVB-T) television system.

10. A method for determining whether a target channel includes a television program signal, wherein the target channel is selected from a plurality of channels included in an RF signal and processed by a down-converting process, the method comprising:
    converting an analog signal carried in the down-converted target channel to a digital signal;
    performing an operation on the digital signal to obtain a correlation comparing result; and
    determining whether the target channel includes the television program signal according to the correlation comparing result.

11. The method according to claim 10, wherein the correlation comparing result comprises a plurality correlation values, and the step of determining whether the target channel includes the television program signal determines whether the target channel includes the television program signal according to a maximum correlation value in the correlation values.

12. The method according to claim 11, wherein the step of determining whether the target channel includes the television program signal determines whether the target channel includes the television program signal according to one of a ratio and a difference between the maximum correlation value and a neighboring correlation value.

13. The method according to claim 11, applied to an ISDB-T television system or a DVB-T television system.

14. The method according to claim 10, before the step of performing the operation on the digital signal to obtain the correlation comparing result, further comprising:
    performing a pre- operation to obtain a pre-correlation comparing result, and
    compensating a CFO of the digital signal according to the pre-correlation comparing result.

15. The method according to claim 14, wherein the step of determining whether the target channel includes the television program signal according to the correlation comparing result determines whether the target channel includes the television program signal according to a frequency offset position indicated by the correlation comparing result.

16. The method according to claim 10, wherein the step of performing the operation on the digital signal to obtain the correlation comparing result further comprises:
    compensating a CFO of the digital signal in time domain according to the correlation comparing result;
    converting the compensated digital signal in time domain f to frequency domain; and performing the operation on the digital signal converted to frequency domain to update the correlation comparing result.

17. The method according to claim 10, further comprising:
when it is determined that the target channel does not include the television program signal, performing one of complex conjugate and IQ swap on the digital signal.

18. The method according to claim 10, further comprising:
when it is determined that the target channel does not include the television program signal, selecting another channel from the plurality of channels.

* * * * *